United States Patent [19]

Sugimoto

[11] Patent Number: 5,176,586
[45] Date of Patent: Jan. 5, 1993

[54] SILENT CHAIN

[75] Inventor: Yoshiaki Sugimoto, Tokorozawa, Japan

[73] Assignee: Tsubakimoto Chain Co., Osaka, Japan

[21] Appl. No.: 758,805

[22] Filed: Sep. 12, 1991

[30] Foreign Application Priority Data

Sep. 13, 1990 [JP] Japan .................................. 2-95536

[51] Int. Cl.$^5$ ............................................. F16G 13/04
[52] U.S. Cl. ................................. 474/212; 474/217; 474/229
[58] Field of Search ............................. 474/212–217, 474/226, 228–231

[56] References Cited

U.S. PATENT DOCUMENTS

| | | | |
|---|---|---|---|
| 1,835,406 | 12/1931 | Kirsten | 474/230 X |
| 2,036,216 | 4/1936 | Johnson | 474/215 |
| 3,359,815 | 12/1967 | Jeffrey et al. | 474/231 |
| 4,911,682 | 3/1990 | Ivey et al. | 474/215 X |
| 4,915,675 | 4/1990 | Avramidis | 474/213 |

Primary Examiner—Ramon S. Britts
Assistant Examiner—Roger J. Schoeppel
Attorney, Agent, or Firm—Flynn, Thiel, Boutell & Tanis

[57] ABSTRACT

A silent chain comprising link plates each having a pair of meshing teeth adapted to mesh with a sprocket tooth, and a pair of connection pin insert holes through each of the link plates adjacent opposite ends thereof. A pair of long and short connection pins are inserted into each of the insert holes. The long connection pin has opposite ends secured within holes formed in guide plates disposed adjacent opposite sides of an array of link plates, which guide plates prevent disengagement from the sprocket teeth. The rigidity of the guide link with respect to transmission of tension along the chain is about one-half the rigidity of the meshing link plate.

6 Claims, 3 Drawing Sheets

SILENT CHAIN

FIELD OF THE INVENTION

The present invention relates to a silent chain for transmission of power.

BACKGROUND OF THE INVENTION

The connection pin for a silent chain may be of a round pin type having a circular section, or a locking joint pin type. The present invention is concerned with a silent chain having a connection pin of the locking joint pin type. The locking joint pin, as shown by the prior art silent chain of FIGS. 1-5, is composed of a pair of long and short connection pins $P_1$ and $P_2$ which are in contact with each other on the rolling surfaces thereof as shown in FIG. 1. At the end of the long connection pin $P_1$, a guide link G shown in FIG. 3 is fixed by mounting and fixing holes H and H at the end of the long connection pin, and a number of meshing link plates M having a pair of meshing teeth T are pivotally connected on the short connection pin $P_2$.

Accordingly, when tension acts on the silent chain, the link plates are stretched alternately and reversely so that a shearing force acts on the connection pin whereby trouble can occur where the guide link G connects to the long connection pin $P_1$ and defines the smallest sectional area which can rupture. In view of this, as disclosed in Japanese Patent Laid-Open No. 101940/1987, to prevent occurrence of the aforesaid rupture, an auxiliary plate having the same shape as that of the meshing link plate is placed on the guide link to increase the shearing strength.

The prior art disclosed in the aforementioned Patent Laid-Open No. 101940/1987 has a disadvantage in that by the lamination of the auxiliary plate, the width of the chain increases and the weight of the chain increases so as to constitute an obstacle to high speed operation of the chain.

According to the present invention, the shearing strength of the connection of the guide link to the long connection pin is not increased, but the rigidity of the guide link is made to be $\frac{1}{2}$ of the rigidity of the meshing link plate, whereby the shearing stress on the long connection pin by the guide link is reduced by half to equally share the tensile pull of the guide link and the meshing link, thus preventing the long connection pin from being ruptured.

DETAILED DESCRIPTION

Figure 1:
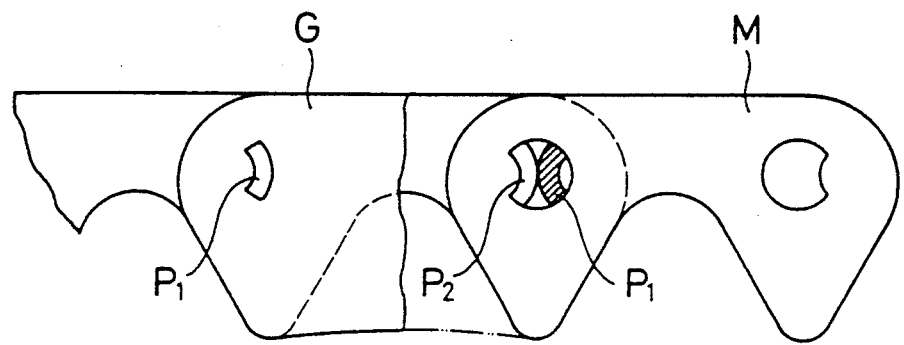
FIGS. 1 and 2 are elevational and sectional views of a portion of a prior art silent chain.
Figure 2:
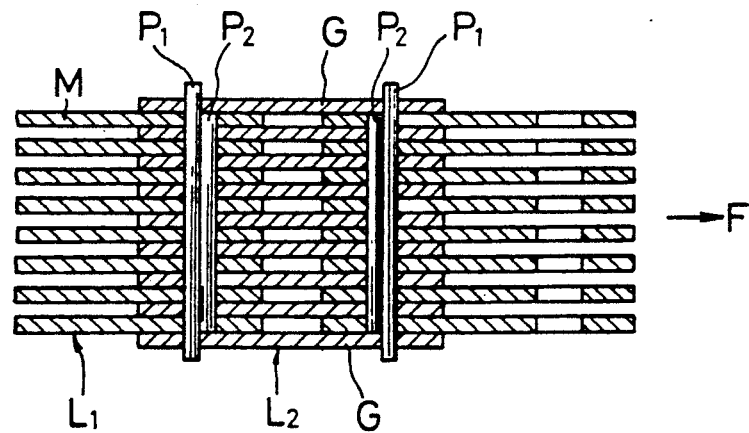
Figure 3:
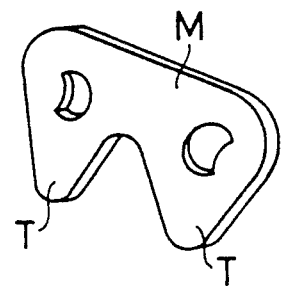
FIGS. 3-5 are perspective views of the parts which makeup the chain of FIGS. 1-2.
Figure 4:
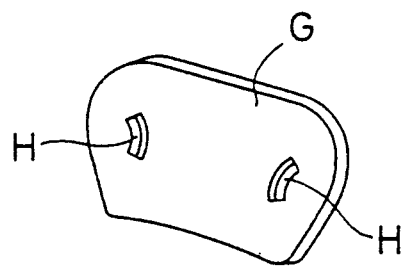
Figure 5:
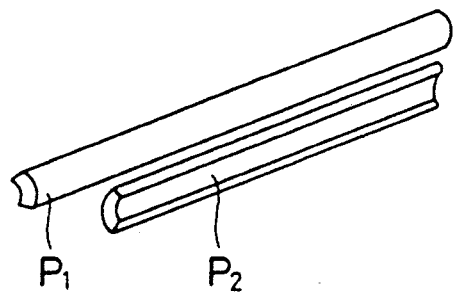

In the meshing links of the silent chain, as shown in FIGS. 1 and 2, the plates of outer link $L_1$ and inner link $L_2$ alternately load a reverse tension on a single connection pin to create a shearing force thereon. However, n-number of meshing link plates M are associated with the outer link $L_1$, whereas (n−1) number of meshing link plates M are associated with the inner link $L_2$. A pair of sidewardly spaced guide links G are connected to opposite ends of the (n−1) number of meshing link plates M associated with link $L_2$ and to the associated long connection pins $P_1$. The meshing link plates M of the outer link $L_1$ are loaded with a tensile load of (−f) with respect to tension F in a direction of the arrow. Therefore, a load of (−f)×(n) acts on the connection pin. On the other hand, a tensile load of (+f) is preferably loaded on each meshing link of the inner link $L_2$, and a tensile load (+$\frac{1}{2}$× f)×(2) acts on the two guide links G and adds to the load (+f)×(n−1) as imposed on the connection pin, whereby a load of (+f) ×(n−1)+$\frac{1}{2}$f×2=+nf acts on the connection pin.

As the result, a load of −nf and a load of +nf act on the outer link $L_1$ and the inner link $L_2$, respectively. Therefore, the sharing of loads by the meshing link plates of the outer link $L_1$, the meshing link plates of the inner link $L_2$ and the guide links becomes equalized, and the meshing link plate as well as the guide link plate have equal rates of elongation with respect to the tensile load of the chain. Therefore, the rupture stress in not concentrated on the root portion of the connection pin.

Figure 6:
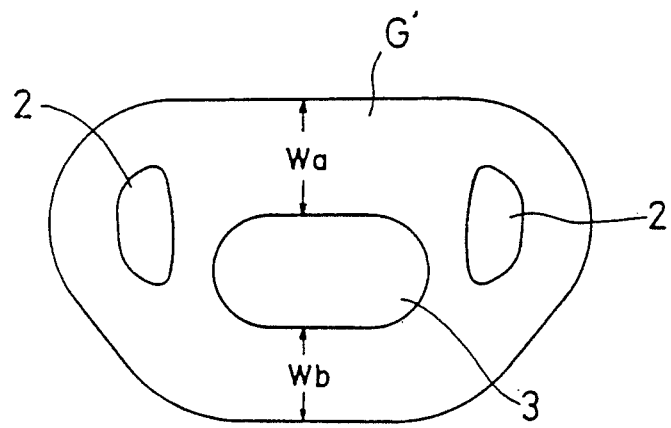
FIG. 6 is a front view showing one embodiment of a guide plate for a chain according to the present invention.
Figure 7:
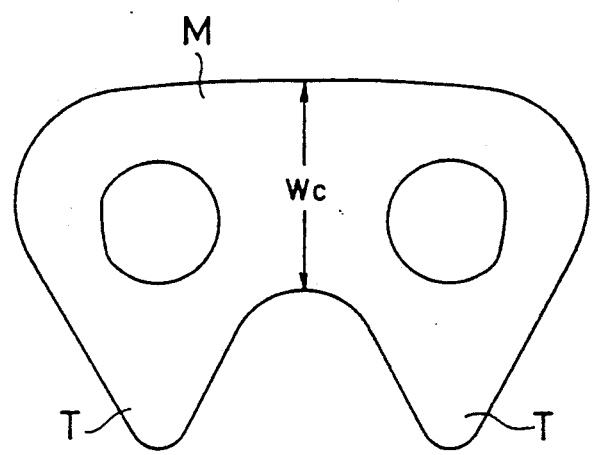
FIG. 7 is a front view of a meshing link plate for the chain of the present invention.

FIG. 6 shows a guide link G′ of the present invention having a rigidity $\frac{1}{2}$ that of a meshing link plate M. The guide link G′ has holes 2 and 2 located adjacent opposite ends for mounting and fixing the ends of the long connection pins $P_1$ and a longitudinally elongated window or hole 3 provided in the central part thereof. The minimum sectional length of link G′ is the sum (Wa+Wb) of the width Wa between the window hole 3 and the upper side of the guide link G′ and the width Wb between the window 3 and the lower side of the guide link. This minimum sectional length (Wa+Wb) of guide link G′ is equal to the minimal sectional length Wc (FIG. 7) which is the width between the upper side of the meshing link plate M and the bottom of the recess between the teeth T. The thickness of the guide link G′ is $\frac{1}{2}$ the thickness of the meshing link plate M, whereby the guide link G′ has a minimum transverse cross-sectional area and hence a rigidity $\frac{1}{2}$ that of the meshing link plate M with respect to tension in the longitudinal direction of the link.

As a further variation, the link material may be changes so that the guide link will have a rigidity $\frac{1}{2}$ that of the meshing link plate.

That is, the Young's modulus of elasticity (E kg/mm$^2$) of a meshing link plate M made of steel is $2.1 \times 10^4$, while that of a guide link G′ made of duralumin is $7.5 \times 10^3$. Duralumin thus has a Young's modulus of elasticity which is about $\frac{1}{3}$ that of steel. Therefore, by increasing the thickness of the guide link G′ made of duralumin, the tensile rigidity of the guide link G′ made of duralumin can be made to be $\frac{1}{2}$ of the rigidity of the meshing link plate M made of steel. In this example, the thickness of guide plate G′ would be about 1.5 that of link M.

Thus, according to the present invention, the rigidity of the guide link G′ with respect to tension is made to be $\frac{1}{2}$ that of the meshing link plate M by modifying the link shape or material. Therefore, the elongation of the meshing link plate M and guide link G′ with respect to the tensile load is equal, and the sharing of load of the meshing link plate M and guide links G′ can be made uniform. That is, the two side guide links G′ combined transmit the same load as, and physically perform the same as each meshing link plate M. The (n−1) link plates and associated guide links G′ of link $L_2$ hence perform the same as the n meshing link plates of the link L₁. With this arrangement, the end portion of the long connection pin P₁ where it connects to the guide link is not bent and deformed or ruptured, the width of the chain is not enlarged, and the weight of the chain is not increased, thus resulting in a high-speed chain which has a long durable life.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A silent chain comprising: guide links associated with and defining opposite sides of a link, link plates each having a pair of meshing teeth adapted to mesh with a sprocket tooth and a pair of connection pin insert holes through each link plate and each guide link adjacent opposite ends thereof, a pair of long and short connection pins inserted into the connection pin insert holes, said long connection pin having an end secured within a hole of each of said guide links to prevent a disengagement with the sprocket tooth, said short connection pin terminating short of said guide links, the rigidity of each guide link with respect to transmission of tension along the chain being about one-half the rigidity of the meshing link plate.

2. A silent chain adapted to be engaged with a pair of toothed sprockets for transmitting power therebetween, said chain including a plurality of first and second links which are alternately and serially arranged throughout the endless length of the chain, each of the first links being defined by a plurality of (n) meshing link plates disposed in a sidewardly aligned but spaced relationship, each of said second links being defined by a plurality of (n−1) meshing link plates disposed in a sidewardly aligned but spaced relationship so that adjacent ends of the meshing link plates of the first and second links meshingly overlap and engage between one another, the meshing link plates of said first and second links all being identical and including a pair of inwardly projecting teeth adjacent opposite ends thereof which are spaced apart by an intermediate recess adapted to receive a sprocket tooth, a connection pin arrangement projecting through transversely aligned openings formed in the overlapping ends of adjacent first and second links for pivotally connecting adjacent links together, a pair of guide link plates associated with and defining opposite sides of each said second link, said pair of guide link plates as associated with each said second link being disposed on opposite sides of the respective plurality of (n−1) meshing link plates, and said connecting pin arrangement including adjacent first and second pins which extend through and couple together the overlapping ends of the meshing link plates associated with adjacent first and second links, said first pin having end portions which project outwardly and fixedly connect to the associated pair of guide link plates, said second pin terminating short of said guide link plates, the improvement wherein each of the guide link plates has a tension strength in the longitudinal direction of the chain which is about one-half the tension strength of the meshing link plate in the longitudinal direction.

3. A chain according to claim 2, wherein the guide link plates have a minimum transverse cross-sectional area which is about one-half the minimum transverse cross-sectional area of the meshing link plates, and the guide and meshing link plates are both constructed of materials having substantially the same modulus of elasticity.

4. A chain according to claim 3, wherein said guide and meshing link plates each have substantially equal minimum wall height dimensions, and wherein the guide line plates have a thickness about one-half the thickness of the meshing link plates.

5. A chain according to claim 4, wherein the guide link plate has a window formed centrally therein and extending transversely therethrough, said window being spaced from opposite side edges of the guide link plate and spaced inwardly from pin-receiving openings defined adjacent opposite ends of the guide link plate.

6. A silent chain for power transmission purposes, comprising: a series of links, each link being comprised of an array of parallel, identical, link plates, the link plates of each link being interleaved with the link plates of adjacent links with the outermost link plates of one link being outside of the outermost link plates of the adjacent link, each link plate having a pair of teeth adapted to mesh with a tooth of a sprocket; a pair of guide plates respectively disposed at opposite lateral ends of the array of parallel link plates of said adjacent link and outside the outermost link plates of said one link, said guide plates being adapted to keep the chain on the sprocket; a rocker joint pin structure pivotally connecting together the interleaved portions of said link plates and guide plates of adjacent links, said rocker joint pin structure comprising laterally aligned openings through said link plates and said guide plates, first and second connection pins of different length disposed in said openings so that one link can rock with respect to the adjacent link when the chain goes on or off the sprocket, said first connection pin extending through said openings in said link plates but not into said openings in said guide plates, said second connection pin being longer than said first connection pin and extending through said openings in said link plates and said guide plates, the rigidity of said guide links with respect to the pull applied to the chain to transmit power being about one-half the rigidity of said link plates.

* * * * *